(12) United States Patent
Chen et al.

(10) Patent No.: US 7,473,033 B2
(45) Date of Patent: Jan. 6, 2009

(54) BALL CIRCULATION SYSTEM FOR LINEAR GUIDE WAY

(75) Inventors: Jen-Sheng Chen, Taichung (TW);
Yu-Wen Tsai, Taichung (TW)

(73) Assignee: Hiwin Technology Corp., Taichung (TW)

( * ) Notice: Subject to any disclaimer, the term of this patent is extended or adjusted under 35 U.S.C. 154(b) by 343 days.

(21) Appl. No.: 11/399,317

(22) Filed: Apr. 7, 2006

(65) Prior Publication Data
US 2007/0237436 A1 Oct. 11, 2007

(51) Int. Cl.
*F16C 29/06* (2006.01)
(52) U.S. Cl. ........................................................ 384/45
(58) Field of Classification Search ............. 384/43–45, 384/13; 464/168
See application file for complete search history.

(56) References Cited

U.S. PATENT DOCUMENTS

| | | | | |
|---|---|---|---|---|
| 2,576,269 A * | 11/1951 | Thomson | ...... | 384/43 |
| 3,008,774 A * | 11/1961 | Morris et al. | ...... | 384/45 |
| 3,086,824 A * | 4/1963 | Barkley | ...... | 384/43 |
| 3,881,787 A * | 5/1975 | Nilsson | ...... | 384/43 |
| 4,850,720 A * | 7/1989 | Osawa | ...... | 384/13 |
| 5,344,237 A * | 9/1994 | Takei et al. | ...... | 384/45 |
| 5,562,346 A * | 10/1996 | Kuo | ...... | 384/45 |

* cited by examiner

*Primary Examiner*—Thomas R Hannon

(57) ABSTRACT

A ball circulation system for linear guide way includes a slide rail, a slider coupled with the slide rail, and two end covers of the slider with an oil scraper. A cross-wise circulation passage and a separated circulation passage respectively formed at two side of the end cover are integrally combined in one structure so as to form two independent and opposite ball circulations. By so space in the circulation system is able to accommodate more rolling balls by twice filling procedure thereby improving the efficiency of assembly work. Besides, up and down motion of the rolling balls during circulation causes a uniform lubrication effect. Allowing accommodation of more rolling balls means substantially improving load carrying ability of the linear guide way.

10 Claims, 12 Drawing Sheets

BALL CIRCULATION SYSTEM FOR LINEAR GUIDE WAY

BACKGROUND OF THE INVENTION

1. Field of the Invention

The present invention relates to a ball circulation system for linear guide way, and more particularly to a ball circulation system in which the cross-wise and the separated turnoff paths are provided integrally or separately in the end covers of the slider for rolling balls to turn away for circulation.

2. Description of the Prior Art

A load transportation mechanism, linear guide way, is composed of a slide rail, a slider and its end covers to slide along the slide rail, an oil scraper affixed to the end cover, and a plurality of rolling balls interposed among the slide rail, the slider, and its end covers to make continuous circulation therefore a load entrained table is transported by the slider linearly moving along the slide rail with a high mechanical precisions.

The turn-off paths for rolling balls to circulate in a conventional linear guide way are generally divided into independently separated (for balls) and cross-wise (for rollers) types as shown in FIG. 1 (separated) and FIG. 2 (cross-wise) respectively. However, both types need to establish four independent circulation paths which being disadvantageous and in convenient for fabrication and practical application, namely:

1. Assembly procedure is time consuming because there are four circulation paths to install rolling balls for each mechanism.
2. Owing to the gravity, the balls in the upper circulation paths usually get more lubricant than those in the lower ones causing an uneven lubrication effect.
3. A non uniform distribution of load occurs between the upper and lower circulation paths.

It is what the reason the inventor has put forth every effort for years by continuous research and experimentation trying to discover the remedy to palliate the inherent shortcomings of the conventional techniques described above, and at last succeeded in realizing the present invention.

SUMMARY OF THE INVENTION

Accordingly, the present invention is to provide a ball circulation system for linear guide way in which the cross-wise and the independent turn-off paths are provided integrally or separately in the end covers of the slider forming two independent and counter-directional circulations.

Another, the present invention is to construct a simple oil passage in the end covers so as to effectively lubricate the rolling balls.

The slider's end cover is composed of a main block, a cover plate, and an outer cap, an upper turn-off path and a lower turn-off path are provided respectively on two sides of the end cover, while the other side thereof is provided with a tilted turn-off path and a U-shaped turn-off path. With this structure, a combined cross-wise and separated circulation system is integrally formed. Moreover, corresponding upper, lower, and tilted turn-off ports are aligned to the upper, lower, and tilted turnoff path respectively. In the main block of the end cover, oil paths in connection with the upper and tilted turn-off paths are formed, and orifices are opened on the main block for the oil paths to lubricate both the upper and tilted turnoff paths and the upper and tilted turn-off ports. When the two identically constructed end covers are fitted to each end of the slider respectively, the turnoff paths of the two end covers are counter positioned. With this arrangement, when the ball starts moving form one of the two end covers along the upper turnoff path to the opposite end cover, then it flows to the lower turn-off path by way of the U-shaped turnoff path thereof, after that it continues to travel along the tilted turn-off path to return to the upper turn-off path of the end cover from where it starts after performing upward circulation. In this manner, the rolling balls continuously perform endless circulation between the slider and the slide rail.

BRIEF DESCRIPTION OF THE DRAWINGS

The above objects and other advantages of the present invention will become more apparent by describing in detail the preferred embodiments of the present invention with reference to the attached drawings in which.

DETAILED DESCRIPTION OF THE PREFERRED EMBODIMENT

Figure 1:
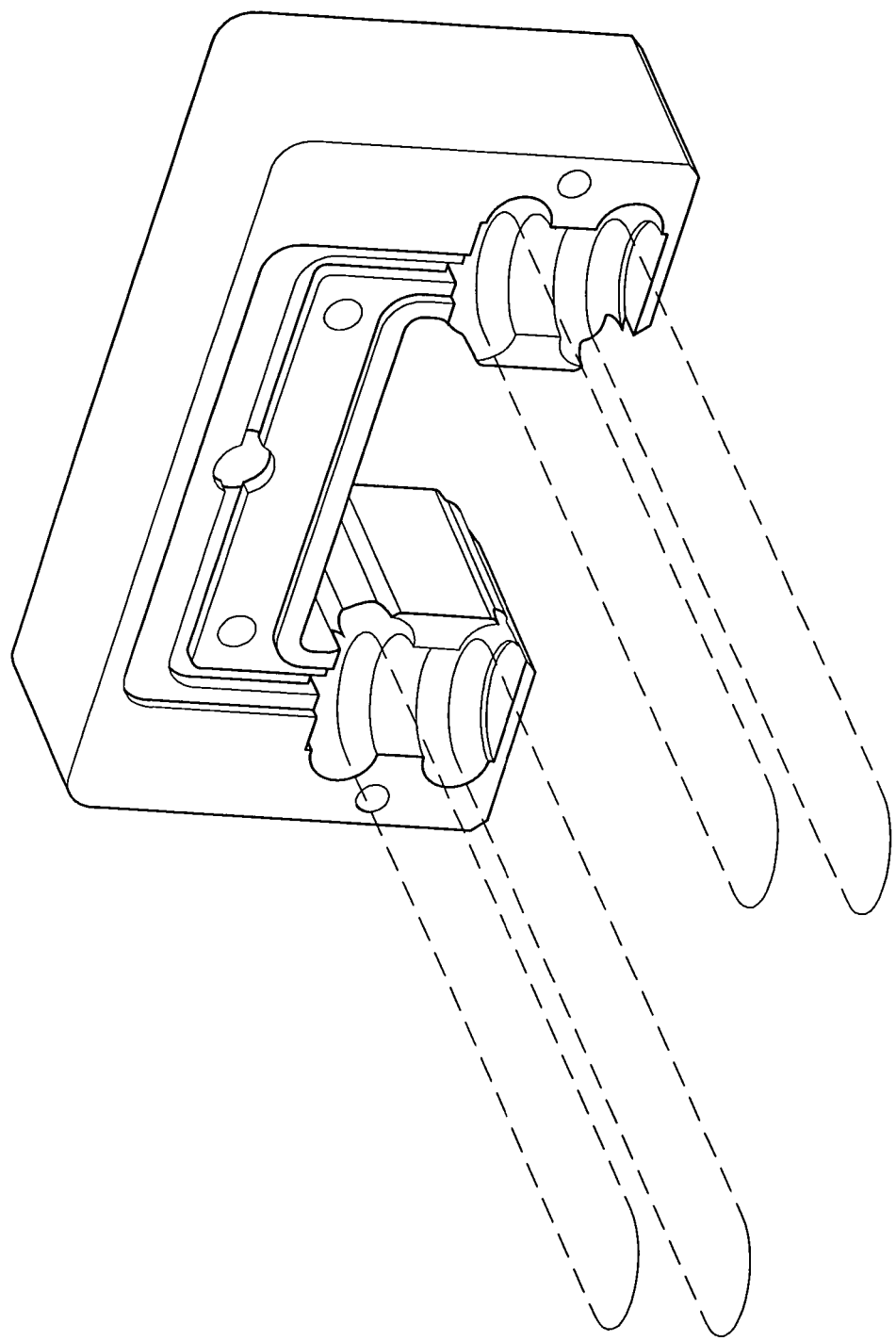
FIGS. 1 and 2 are two perspective views of conventional linear guide way.
Figure 2:
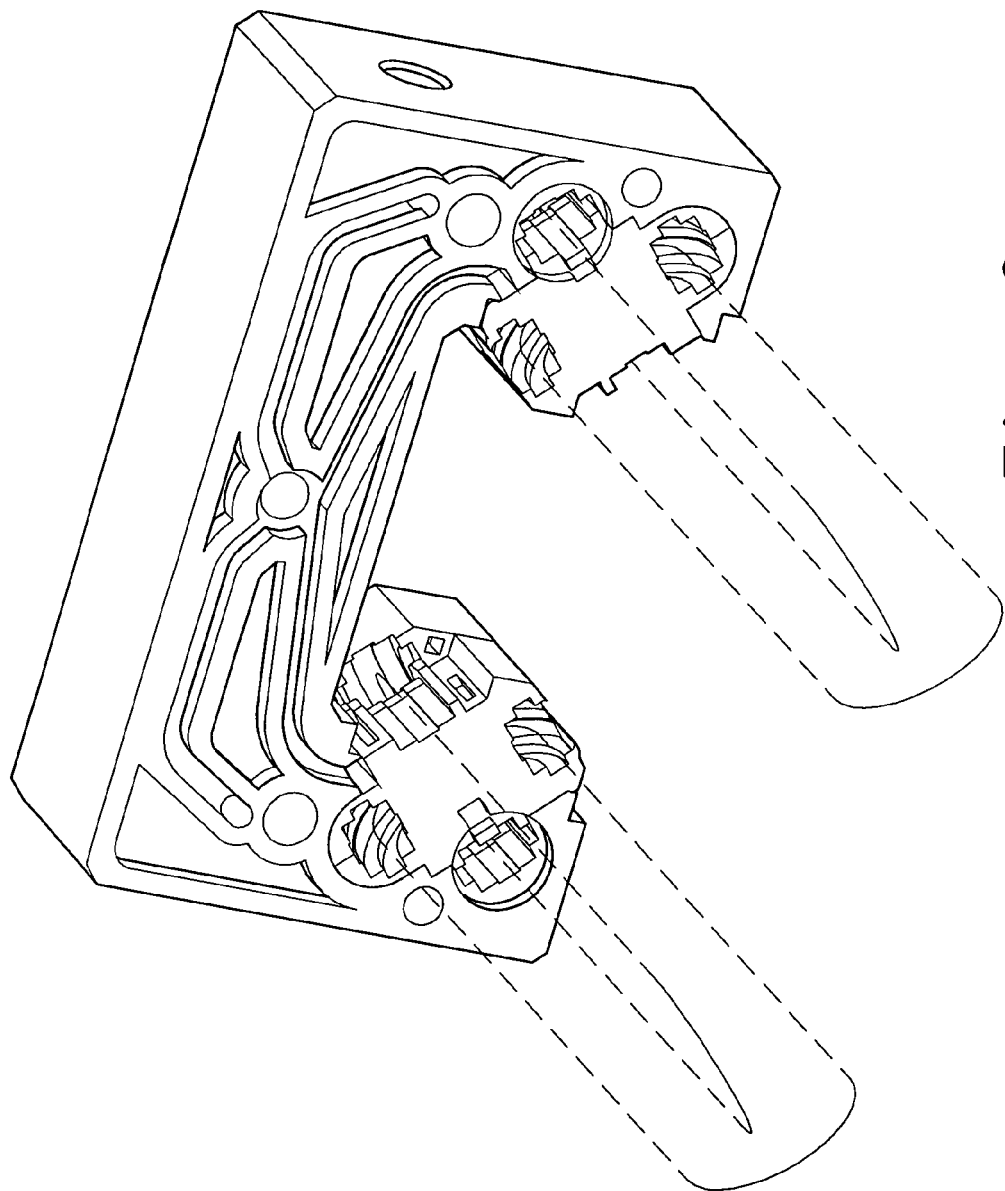
Figure 3:
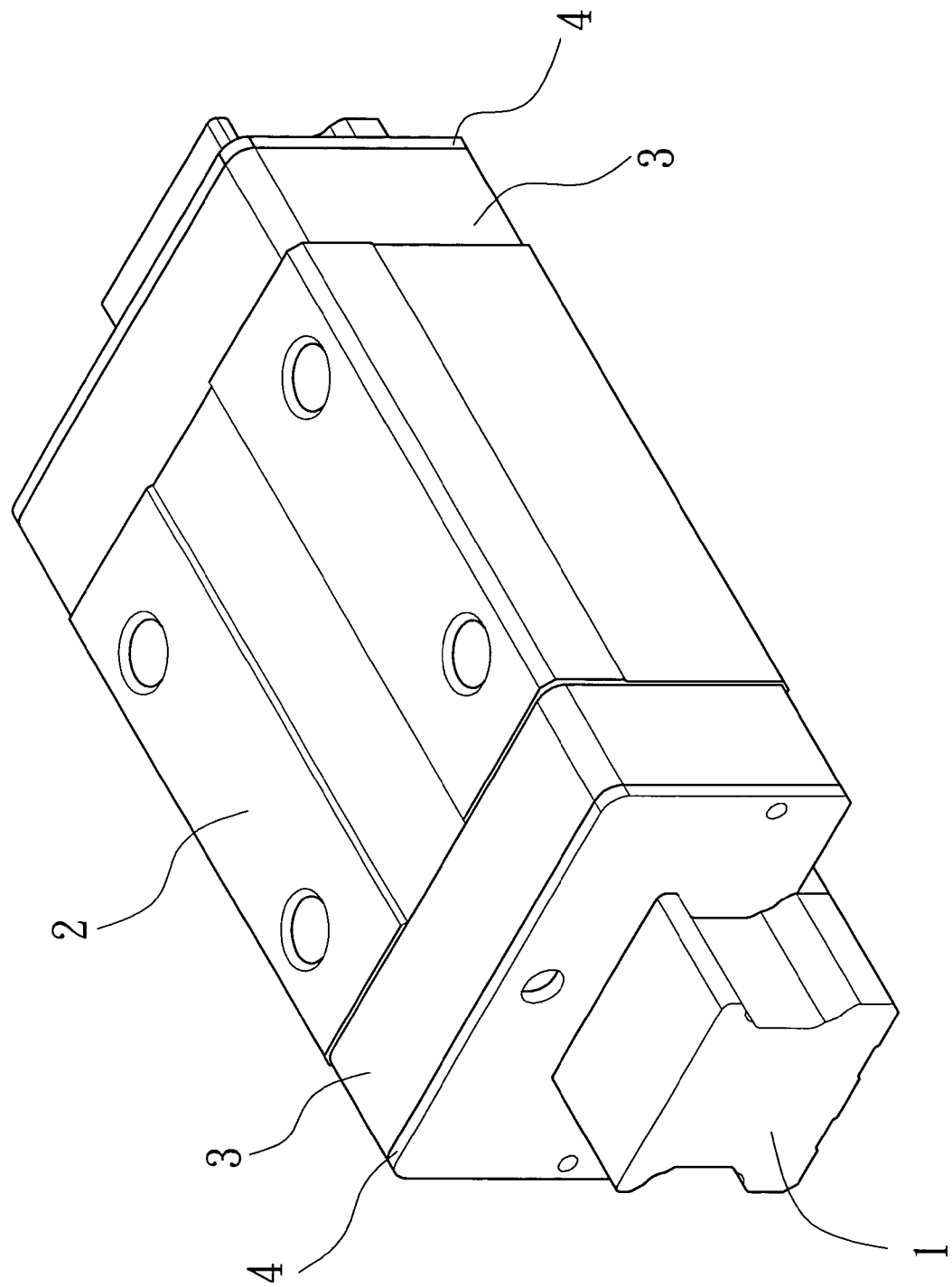
FIG. 3 is a perspective view of the linear guide way using a ball circulation system of the present invention.
Figure 4:
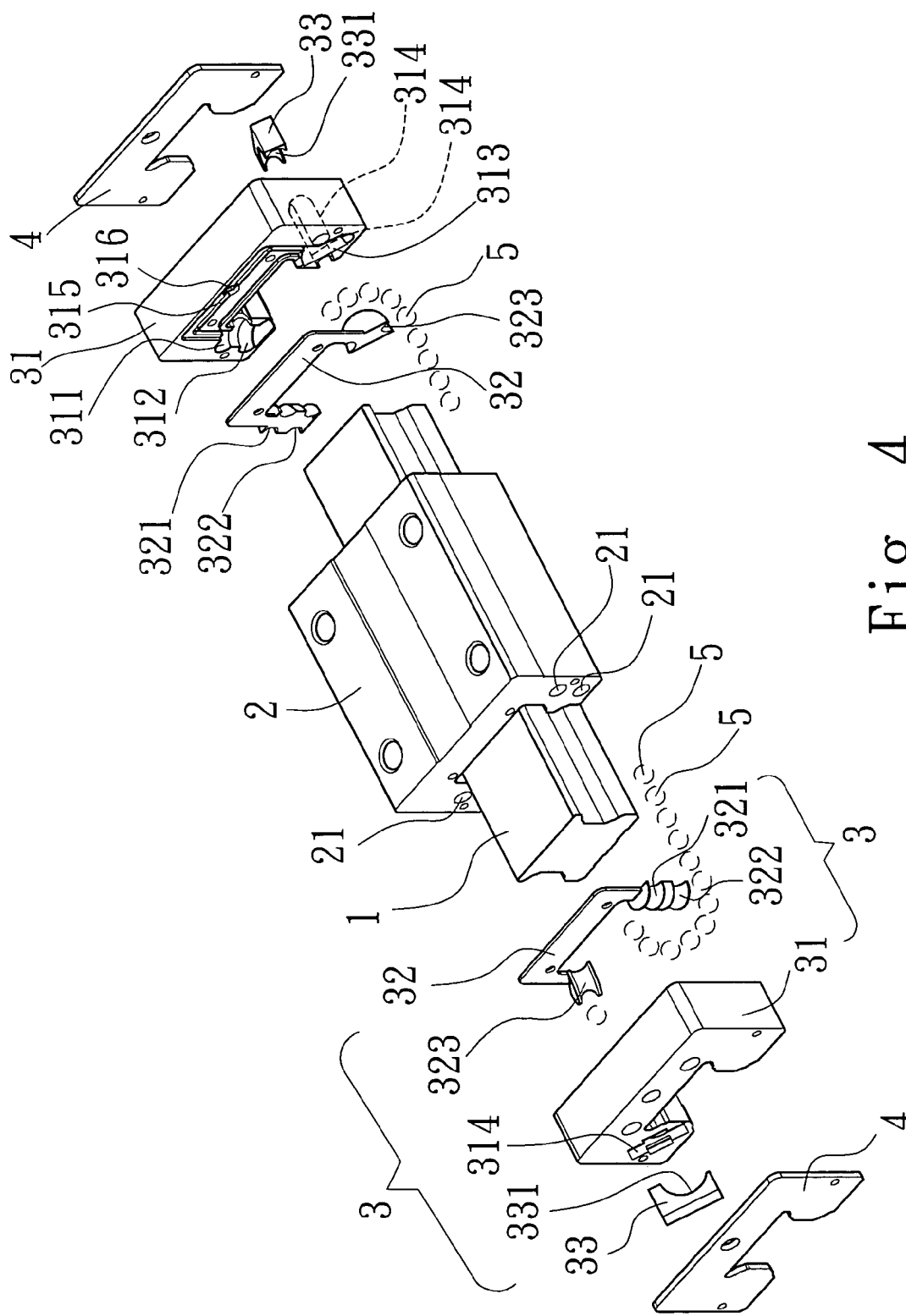
FIG. 4 is an exploded illustrative view of the linear guide way using the ball circulation system of the present invention.
Figure 5:
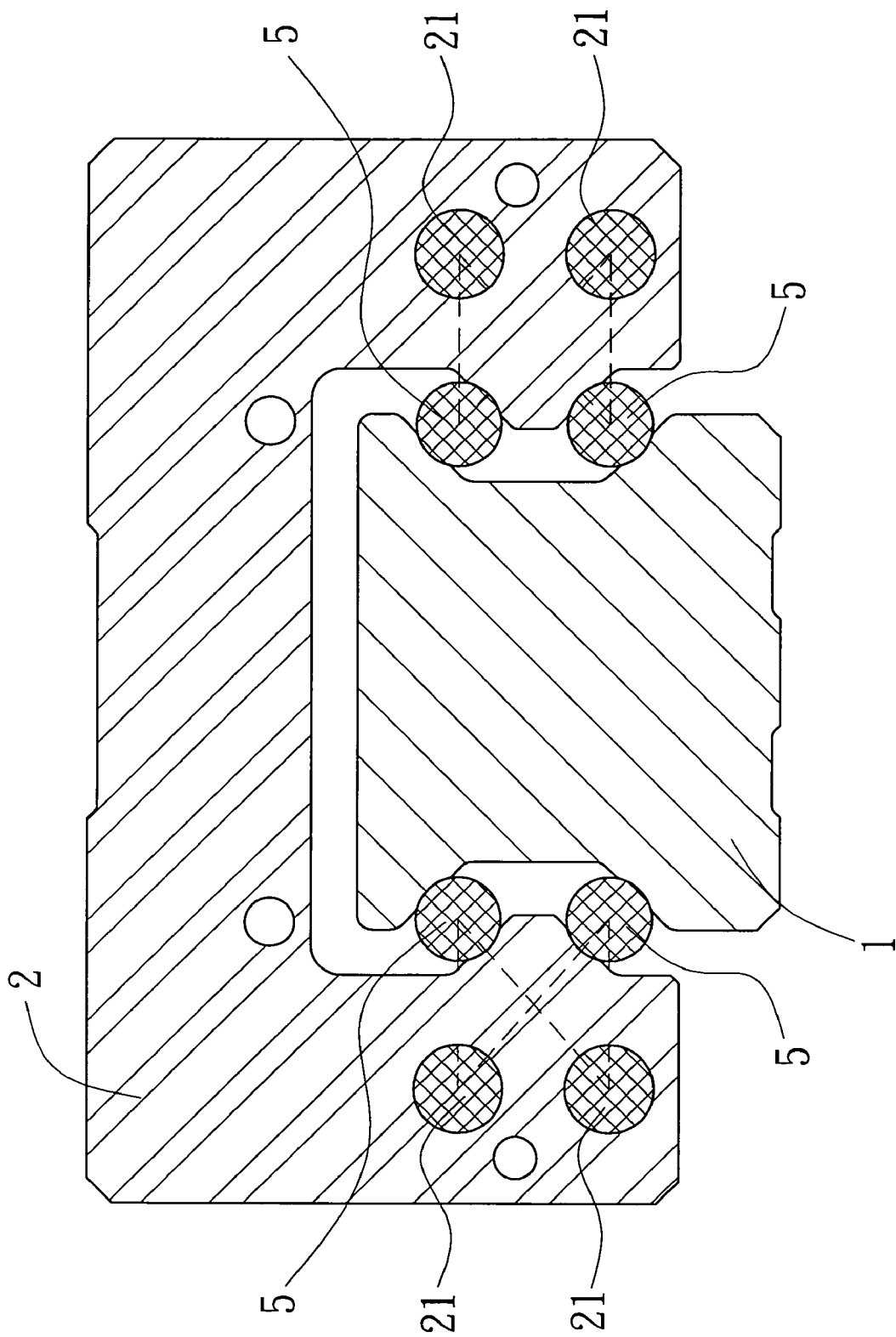
FIG. 5 is a transverse cross sectional view of the linear guide way using the ball circulation system of the present invention.

Referring FIG. 3 through FIG. 5, the linear guide way using the ball circulation system of the present invention is composed of a slide rail 1, a slider 2 sliding along the slide rail 1, two end covers 3 for the slider 2, two oil scraper 4 attached to the end covers 3, and a plurality of rolling balls 5. An upper and lower circulation spaces (no numeral symbol, refer to FIG. 5) along both sides of the linear guide way are left for rolling balls to make an endless circulation.

Figure 6:
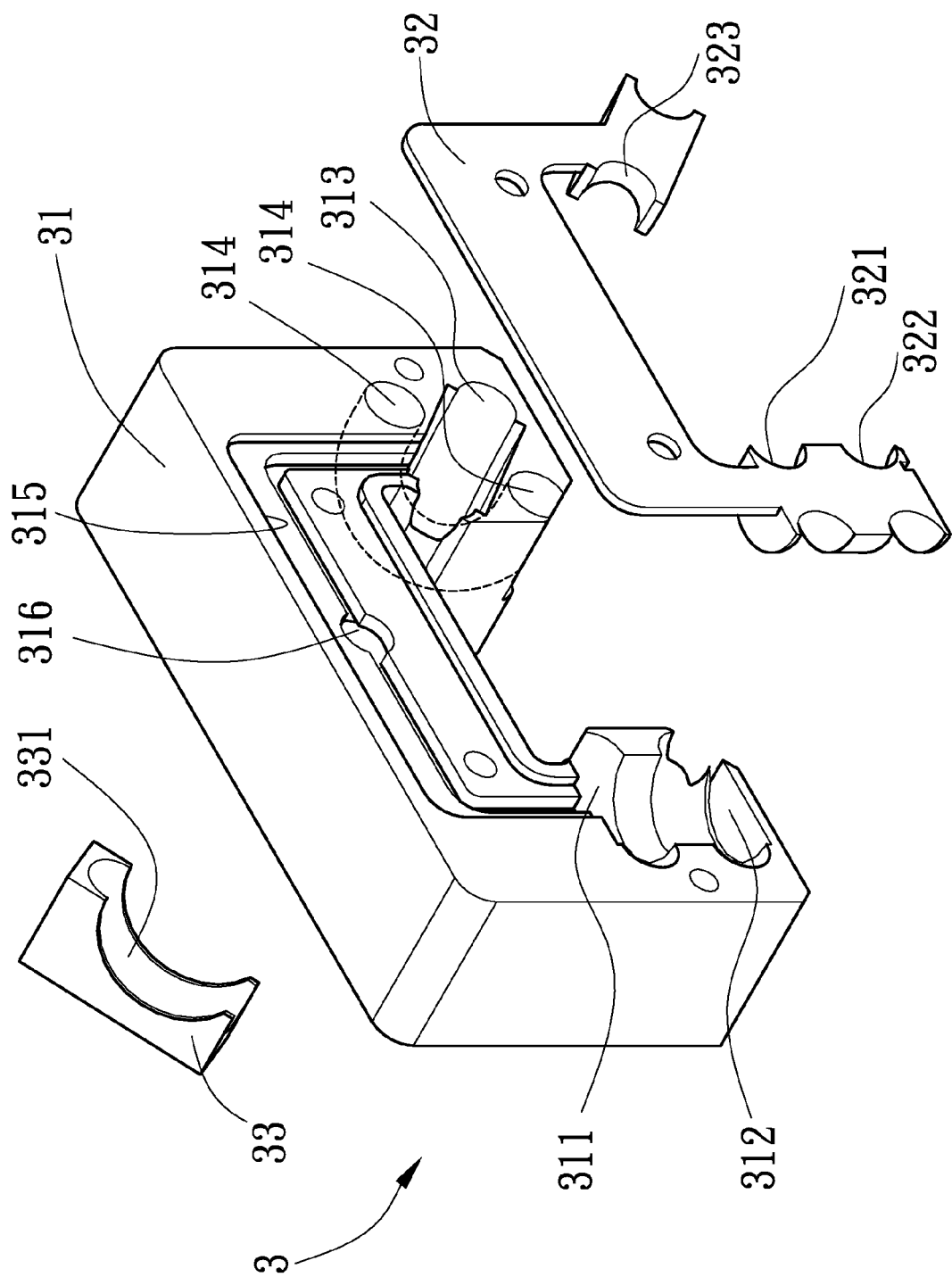
FIG. 6 is an exploded illustrative view of the end cover according to the present invention.

Referring to FIG. 6, the exploded view of the end cover, the kernel of the present invention lies in that the end cover 3 is composed of a main block 31, a cover plate 32, and an outer cap 33.

An upper turn-off path 311 and a lower turn-off 312 path are separately provided at one side of the main block 31, while the other side thereof are provided with a tilted turn-off path 313, and a U-shaped turn-off path 314 facing cross-wise to the path 313, and a vacancy is remained at the rear side of the U-shaped turn-off path 314 facing to an oil scraper 4 for the convenience of filling rolling balls. Besides, an oil path 315 in connection with the upper and tilted turn-off paths 311 and 313 is provided on the surface of the main block 31 facing to the slider 2, and the oil path 315 is provided with an orifice 316 for infusing lubrication oil to the upper and tilted turn-off paths 311 and 313.

An upper turning port 321, and a lower turning port 322 separated with each are provided at one side of the cover plate 32 facing respectively to the upper and lower turn-off paths 311 and 312, and a tilted turning port 323 is facing to the tilted turn-off path 313.

The outer cap 33 is for closing the rear side of the vacancy of the U-shaped turn-off path 314, and another tilted turning port 331 is formed facing to the U-shaped turn-off path 314 of the main block 31.

Figure 7:
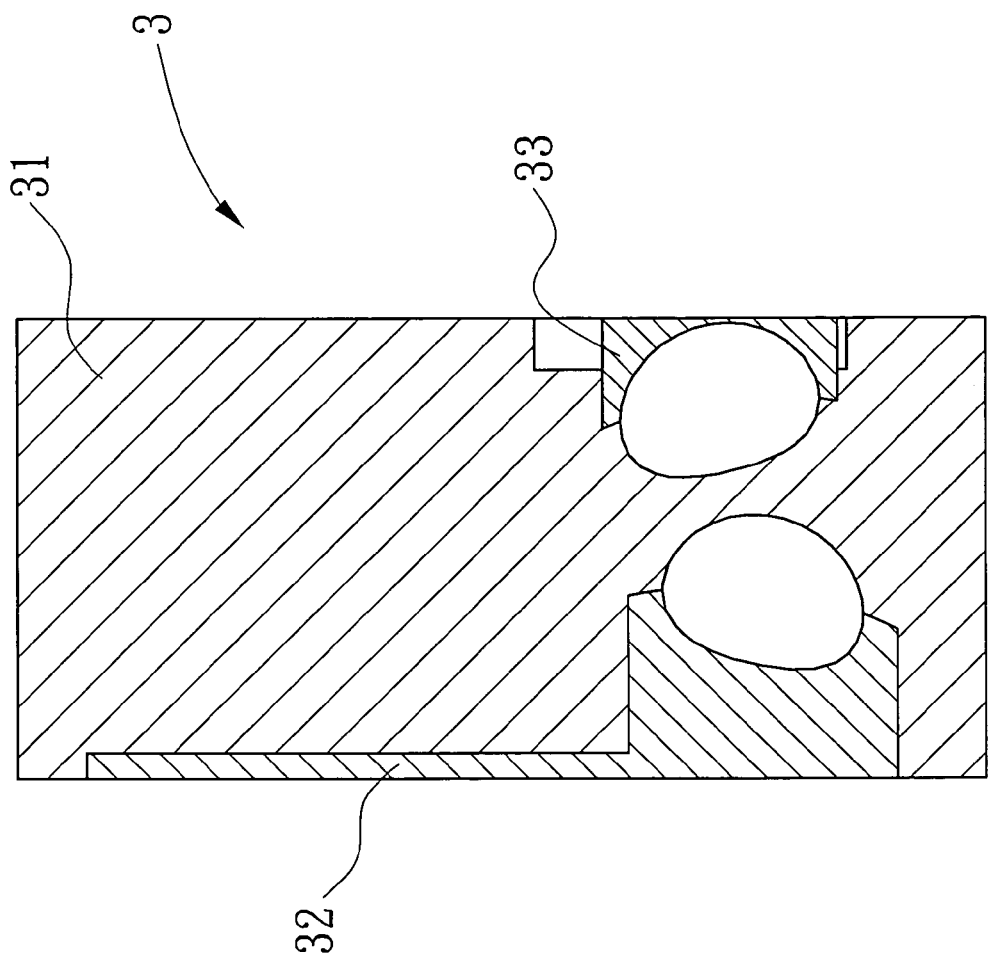
FIG. 7 is an cross sectional view of the end cover according to the present invention.

Referring to FIG. 7, in this cross sectional view of the end cover, it shows how the end cover 3 including its main block 31, cover plate 32, and outer cap 33 is assembled with the linear guide way. At first two similar cover plates 32 are respectively attached to two ends of the slider 2, and then two similar main block 31 are covered by respective cover plates 32 by aligning their upper, lower, and tilted turn-off paths 311, 312 and 313 to the upper, lower, and tilted turning ports 321, 322, and 323 of the cover plates 32 respectively. At this time two front ends of the U-shaped path 314 of each main block 31 is just facing to the lower rolling space (see FIGS. 5, 6 and 8) when an upper rolling path 21 of the slider 2 and the slide rail 1 are coupled with the slider 2, and two sides of each coupled cover plate 32 with the main block 31 are formed into cross-wise and separated turning direction. Then by mating the cross-wise tuning position of one cover plate 32 and the main block 31 with the separated turning position of the other cover plate 32 and the main block 31, and by mating the separated turning position of the former with the cross-wise turning position of the latter, an integrated cross-wise and separated circulation vacancy can be obtained at both sides of the linear guide way. In the last step, fixedly close the rear side of vacancy formed at the place the outer cap 33 facing to the U-shaped turn-off path 314 of the main block 31 after filling the rolling balls 5 into the linear guide way from the vacancy thereby completing the assembly of the end cover 3.

Figure 8:
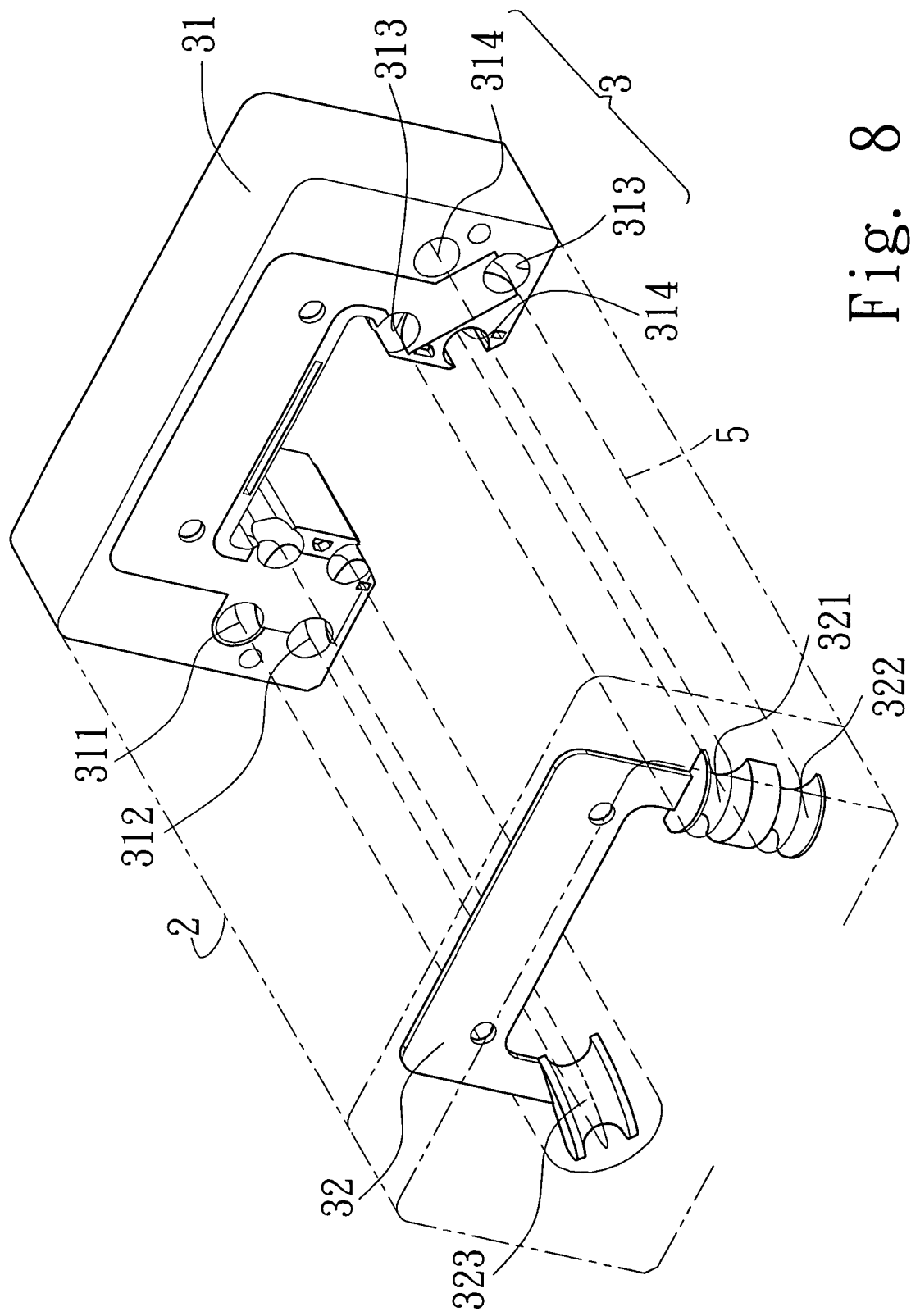
FIG. 8 is an illustrative view showing how to assemble the end cover with the linear guide way according to the present invention.

Referring to FIG. 8, this drawing illustrate how to assemble the end cover 3 with the linear guide way. After the upper, lower, and tilted turn-off paths 311, 312, and 313 formed at both sides of the main block 31 are respectively mated with the separated upper and lower turning ports 321, 322, and the tilted turning port 323 formed on the cover plate 32, and closing the U-shaped turn-off path 314 of the main block 31 with the outer cap 33, both the cross-wise and separated turning circulation passages will be provided at two sides of the end cover 3. In this manner, after the two similarly constructed end covers 3 are respectively fitted to two ends of the slider 2, the turning circulation passage of the two end covers 3 will be located at opposite positions.

With this construction, when the ball 5 starts traveling from one end cover 3 to the other via upper turn-off path 311, it makes a downwards turning by way of the U-shaped turn-off path 314 of the latter end cover 3 and reaches the lower turn-off path 312 of the former end cover 3. Then continues to travel along the tilted turn-off path 313 of the latter end cover 3 thereby making an upwards turning and returns to the upper turn-off path 311 of the former end cover 3. Such an endless circulation of the ball 5 between the slide rail 1 and the slider 2 will be maintained as long as the linear guide way operates.

It emerges from the above description that the ball circulation system for linear guide way according to the present invention in which the cross-wise and separated circulation passages are integrally combined together by the end covers 3 is apparently more advantageous than one in which the two circulation passages are segregated as in the conventional techniques in several respects, namely:

1. The two independent circulations combined in one piece only needs twice operations to fill the rolling balls resulting in facilitating assembly work.

2. Rolling balls 5 are able to make up and down circulation and uniformly lubricated with a simply constructed oil circulation path.

3. Up and down circulation of rolling balls 5 causes reducing their load stress, the lengthened circulation passage allows to accommodate more rolling balls 5 in the linear guide way further contributes to reducing their loading stress.

In addition, for further variation of design aspect for the end cover structure, some of the extra design features are added for the end cover 3.

Figure 9:
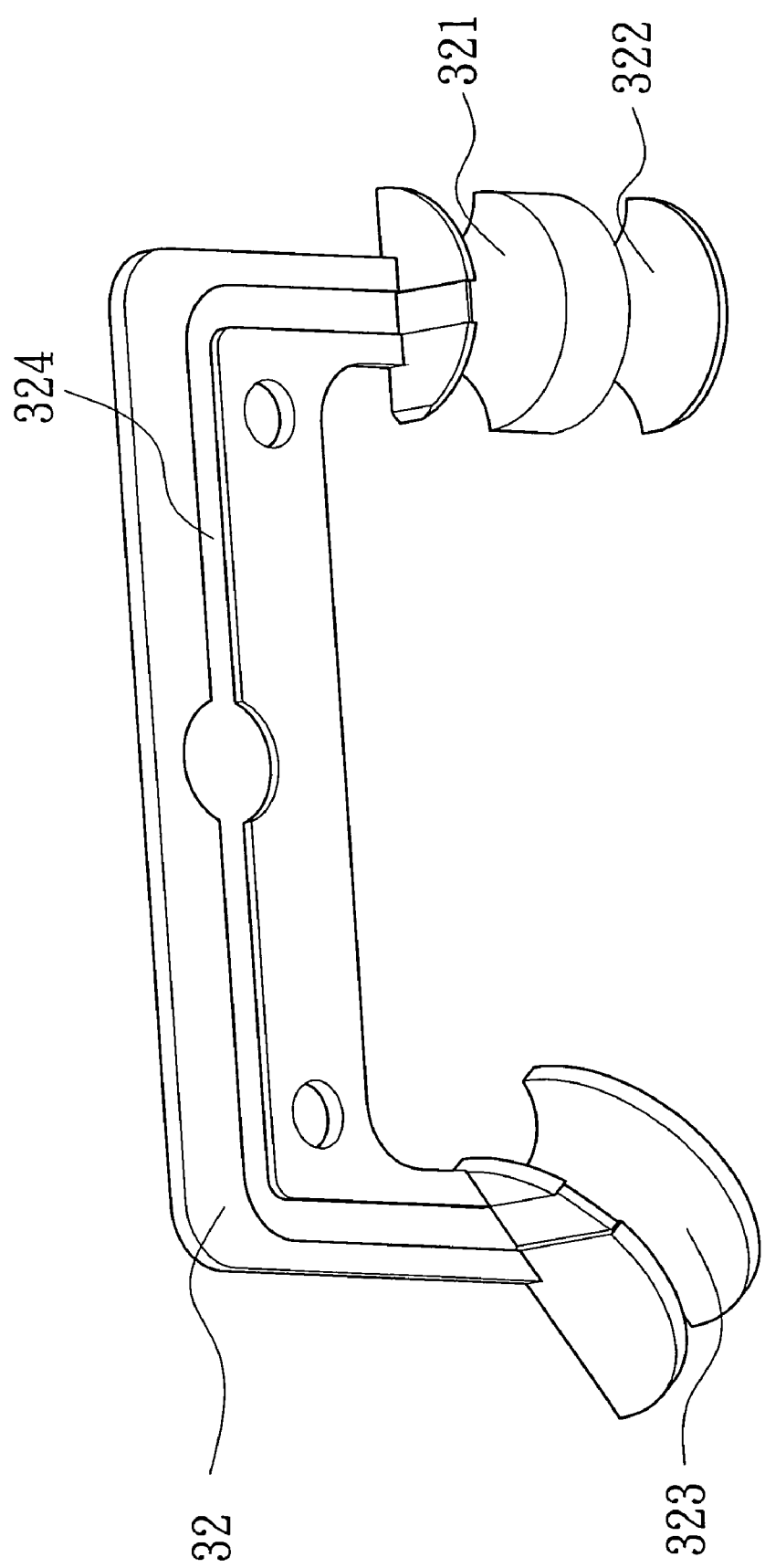
FIG. 9 to 12 are from first to four embodiments in order according to the present invention.

In a first embodiment shown in FIG. 9, the oil path 315 formed on the main block 31 is replaced by an oil path 324 formed on the cover plate 32. The oil path 324 is in connection with the upper and tilted turning ports 321 and 323 so as to introduce the externally supplied oil into the oil path 324 from the orifice 316 of the main block 316 thereby lubricating the rolling balls 5 via upper and tilted turning posts 321 and 323.

Figure 10:
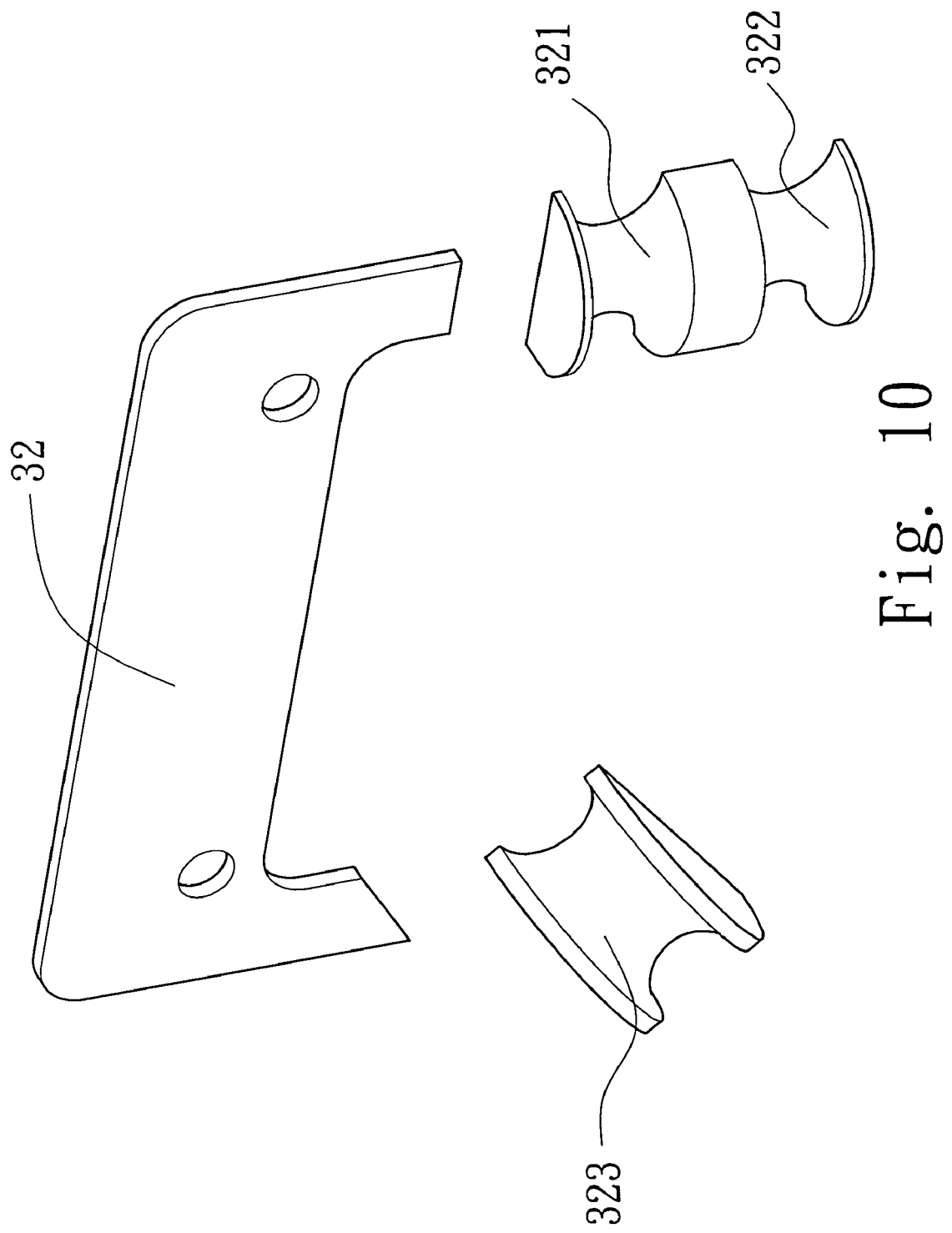

In a second embodiment shown in FIG. 10, alternatively, the upper, lower, and tilted turning ports 321, 322, and 323 are assembled with the cover plate 32 after separately formed into independent structure instead of integrally formed at the beginning as that described above.

Figure 11:
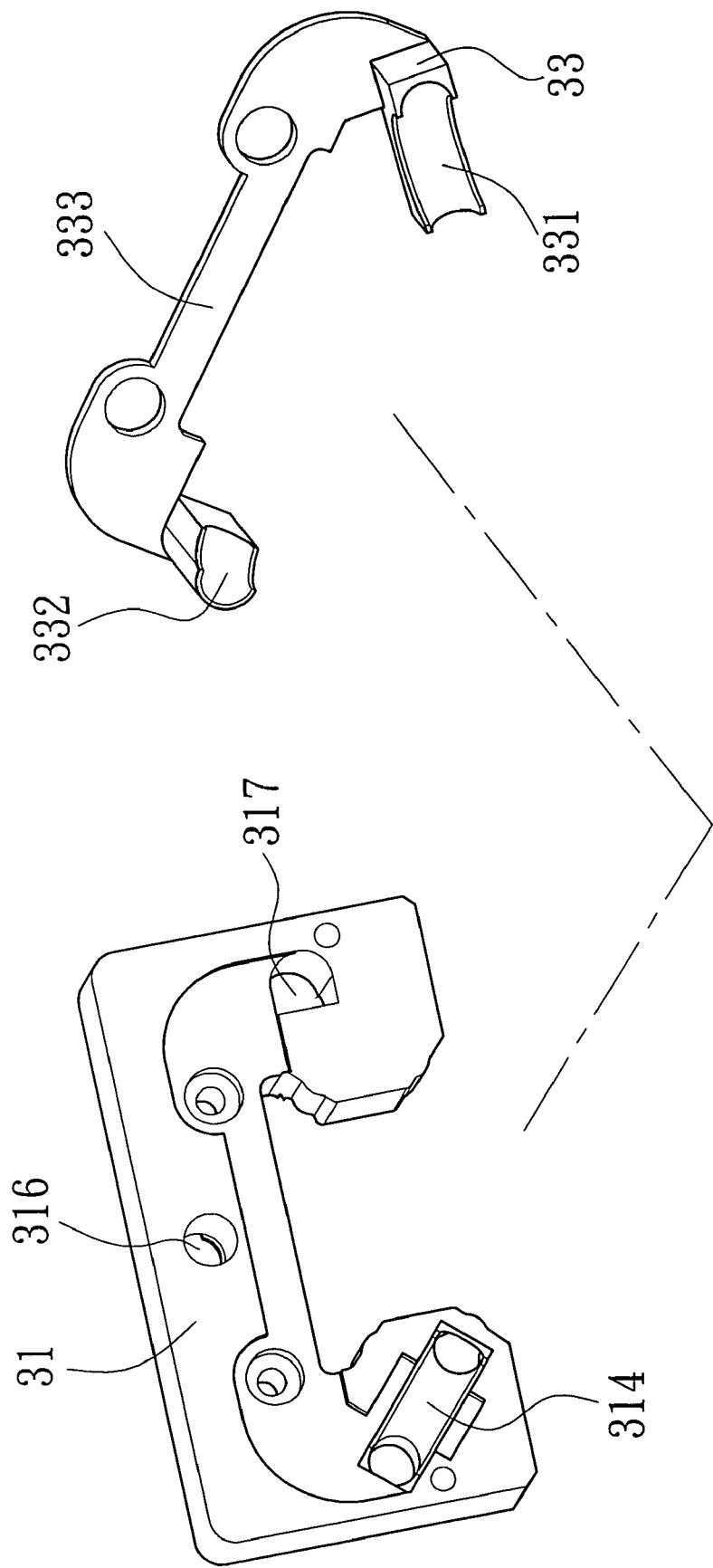

In a third embodiment shown in FIG. 11, the vacancy 317 is provided on the main block at the rear position opposite of the oil scraper 4 for the upper or lower turn-off paths 311, 312, and a turning port 322 facing to the vacancy 317 is formed on the outer cap 33, and the turning port 332 and the tilted port 331 are engaged in one piece with a connecting arm 333.

Figure 12:
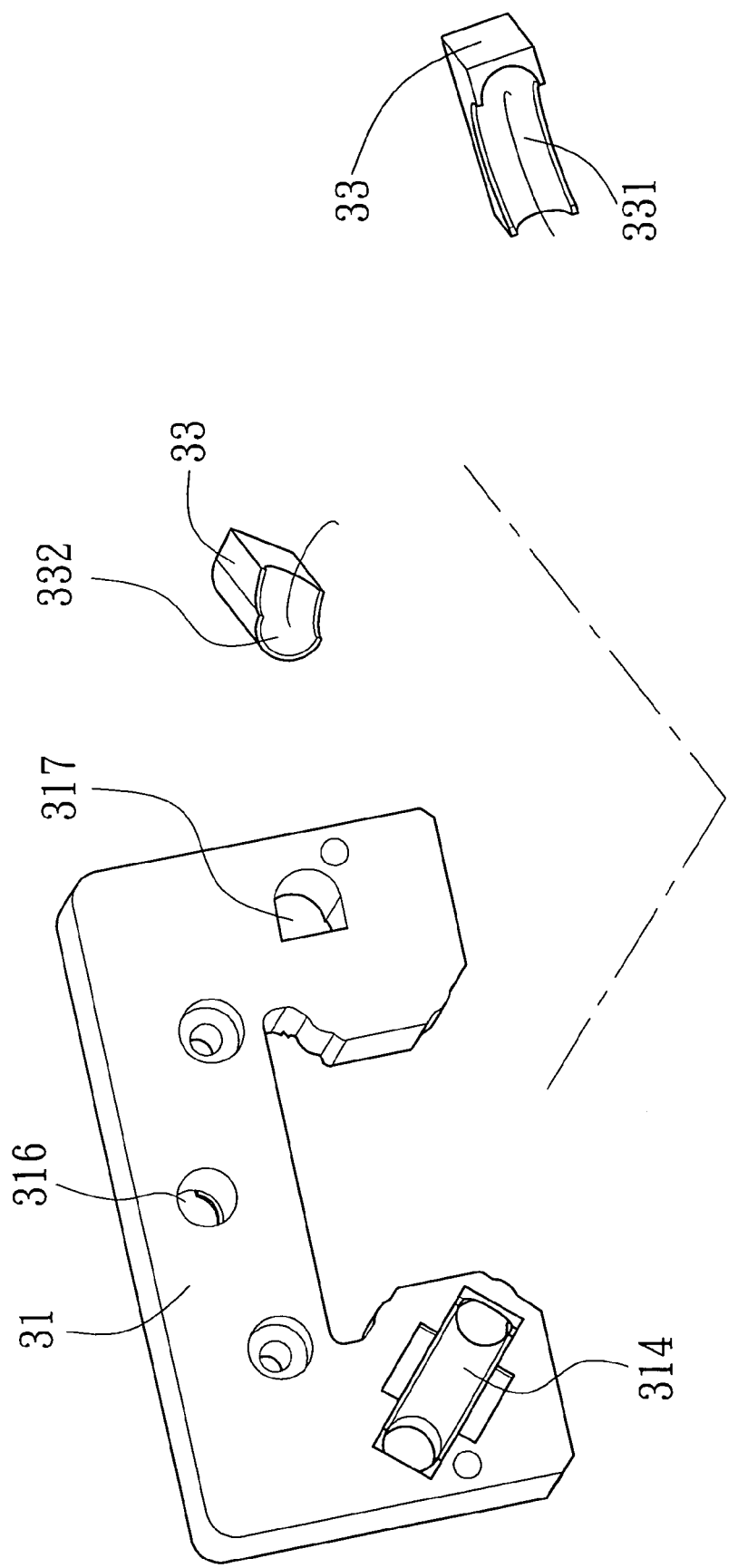

In a fourth embodiment shown in FIG. 12, the vacancy 317 and the turning port are formed in similar way as the third embodiment, the only difference is that the two turning ports 331 and 332 are separately formed.

While the invention has been described in terms of what are presently considered to be the most practical and preferred embodiments, it is to be understood that the invention need not be limited to the disclosed embodiments. On the other hand, it is intended to cover various modifications and similar arrangement included within the spirit and scope of the appended claims which are to be accorded with the broadest interpretation so as to encompass all such modifications and similar structures.

What is claimed is:

1. A ball circulation system for a linear guide way, comprising:

an upper turn-off path and a lower turn-off path separately and formed along one direction on one side portion of two end covers of a slider and a tilted turn-off path and a U-shaped turn-off path cross-wise formed on the other side portion thereof, to allow a plurality of rolling balls to make an endless circulation from the upper turn-off path and the lower turn-off path of one of the end covers to the tilted turn-off path and the U-shaped turn-off path of the other one of the end covers along a slide rail of said linear guide way.

2. The ball circulation system of claim 1, wherein said end cover including a main block, and a cover plate an upper and a lower turn-off paths are formed on one side portion of said end cover, while the other side portion thereof is provided with said tilted turn-off path and said U-shaped turn-off path, an upper and a lower turning ports facing to said upper and said lower turn-off paths are respectively provided on one side of said cover plate, and a tilted turning port facing to said tilted turn-off path is provided on one side of said cover plate.

3. The ball circulation system of claim 2, wherein an oil path in connection with said upper and said tilted turn-off paths is formed on said main block of said end cover, and an orifice is provided for said oil path to infuse lubrication oil for lubricating said upper and said tilted turn-off paths.

4. The ball circulation system of claim 2, wherein an oil path in connection with said upper and said tilted turning ports is formed on said cover plate, and an orifice is provided on said main block to infuse lubrication oil for said upper and said tilted turning ports.

5. The ball circulation system of claim 2, wherein said upper, lower, and tilted turning ports are integrally formed with said cover plate.

6. The ball circulation system of claim 2, wherein said upper, lower, and tilted turning ports are independently formed as a separate structure, and then being assembled together with said cover plate.

7. The ball circulation system of claim 2, wherein said end cover further includes an outer cap to close a vacancy remained by said U-shaped turn-off path formed on said main block from behind for filling said rolling balls therefrom.

8. The ball circulation system of claim 7, wherein a tilted turning port facing to said U-shaped turn-off path formed on said main block, is provided on said outer cap.

9. The ball circulation system of claim 7, wherein a vacancy is remained for said upper or said lower turn-off path formed on said main block at the rear position opposite of an oil scraper, and a turning port facing to said vacancy is formed on said outer cap, said turning port and said tilted turning port are engaged in one piece with a connecting arm.

10. The ball circulation system of claim 7, wherein a vacancy is remained for said upper or said lower turn-off path formed on said main block at the rear position opposite of an oil scraper, and a turning port facing to said vacancy is formed on said outer cap, said turning port and said tilted turning port are separately formed.

* * * * *